United States Patent Office 3,657,412
Patented Apr. 18, 1972

3,657,412
WOOD IMPREGATION COMPOSITIONS WITH PHOSPHORIC ACID ESTER SOLVENT
Wolfgang Reuther, Heidelberg, Harro Petersen, Frankenthal, Paul Raff, Ludwigshafen, and Ernst-Heinrich Pommer, Limburgerhof, Germany, assignors to Badische Anilin- & Soda-Fabrik Aktiengesellschaft, Ludwigshafen (Rhine), Germany
No Drawing. Filed Jan. 26, 1970, Ser. No. 5,946
Claims priority, appplication Germany, Jan. 28, 1969,
P 19 04 072.3
Int. Cl. B27k *3/38*
U.S. Cl. 424—15.7
8 Claims

ABSTRACT OF THE DISCLOSURE

An impregnant for wood comprising a salt of N-nitrosocyclohexylhydroxylamine dissolved in a solvent of a phosphoric acid ester of the formula:

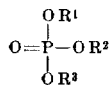

wherein the radicals $R^1$, $R^2$ and $R^3$ which may be identical or different, are alkyl, cycloalkyl, alkoxyalkyl or aryl radicals, or $R^1$ and $R^2$ together denote an alkylene radical.

---

This invention relates to wood impregnation processes and in particular it relates to the use of phosphoric acid esters as solvents in such processes. For a wide range of commercial aplications wood must be impregnated with various active ingredients such as pesticides, waterproofing agents or oilproofing agents. To achieve the maximum effect, the active ingredients must penetrate the wood as deeply as possible. Thus the solvents used, in addition to being good solvents for the active ingredients, must be capable of penetrating wood to a substantial depth. This penetrating power is particularly important in cases where wood preservatives are used on wood-base materials to be exposed to weathering, since a large number of wood preservatives are washed or evaporated out of the wood often after a short period of time if they only adhere to the surface of the wood or penetrate it to a small depth only. Most of the conventional solvents used for wood preservatives or other active ingredients exhibit only poor wood-penetrating properties.

We have now found that phosphoric acid esters of the general formula:

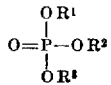

where the radicals $R^1$, $R^2$ and $R^3$, which may be identical or different, are alkyl radicals having 3 to 7 carbon atoms; cycloalkyl radicals having 5 to 6 ring carbon atoms, optionally substituted by one or more than one alkyl radical having 1 to 3 carbon atoms; alkoxyalkyl radicals, particularly alkoxyethyl radicals, in which the alkoxy radical contains 1 to 4 carbon atoms; or aryl radicals, particularly the phenyl radical optionally substituted by one or more than one alkyl radical having 1 to 4 carbon atoms; or where $R^1$ and $R^2$ together denote an alkylene radical having 2 to 3 carbon atoms which may or may not be substituted by alkyl radicals having 1 to 3 carbon atoms, may be advantageously used, if desired in admixture with other solvents, in impregnation applications.

The above phopshoric acid esters show particularly good penetration properties when tested in accordance with German Standard Specification No. 52,618 to determine wood preservative penetration. When, in accordance with the present invention, conventional wood preservatives are dissolved in phosphoric acid ester and the solution is used for impregnating the wood which it is desired to protect, the solution, and with it the wood preservative, penetrates the wood particularly deeply. The phosphoric acid ester may also be mixed with solvents which do not possess optimum penetration properties in order to obtain solvent mixtures capable of penetration to a greater or lesser degree according to the proportions of solvents used. The penetration achieved by the mixture is, however, always greater than that obtained with the solvents alone.

The following compounds are examples of suitable phosphoric acid esters for the process according to the invention: tri-isopropyl phosphate, tri-n-butyl phosphate, trihexyl phosphate, tri-isobutyl phosphate, tricyclohexyl phosphate, 2-oxo-2-ethyl-1,3,2-dioxaphosphorinane and tricresyl phosphate.

Active ingredients which are introduced into wood by impregnation are, for example, any of the usual wood preservatives, such as pentachlorophenol, cresols or salts of N-nitrosocyclohexylhydroxylamine, for example the calcium and potassium salts.

The following table lists the depths of penetration of some of the commonly used solvents as determined, using pine wood, in accordance with German standard specification No. 52,618. To ascertain the penetrating power of solvents in wood, the solvent was admixed with 0.5% by weight of Sudan black. 1.25 g. of the resulting liquid mixture was evenly brushed onto the planed surface of air-dried pine blocks measuring 10 x 5 x 2 cm. After 7 days' storage, each block was cross-cut at three places by means of a saw, and the depth of penetration was measured at 7 points along each cut. This gave 21 results for each block, of which the mean was taken.

TABLE I

| Solvent: | Penetration, mm. |
|---|---|
| Methyl glycol acetate | 2 |
| Butyl glycol acetate | 2 |
| Ethyl glycol acetate | 2 |
| Sec-butyl propionate | 0.5 |
| Sec-butyl acetate | 2 |
| Tert-butyl acetate | 2 |
| Tert-butyl propionate | 3 |
| Dioxane | <1 |
| Formamide | <1 |
| Dimethyl formamide | <2 |
| Dimethyl sulfoxide | 2 |
| Methyl diglycol | 1 |
| Glycol | 2 |
| Methyl glycol | 1 |
| Cyclohexanone | 3 |

Table II lists the depths of penetration of some of the phosphoric acid esters employed in accordance with the present invention.

TABLE II

| Solvent: | Penetration, mm. |
|---|---|
| Tri-isobutyl phosphate | 12 |
| Tri-n-butyl phosphate | 11 |
| Tripropyl phosphate | 6 |
| Tri-isopropyl phosphate | 8 |
| Tri-n-butoxyethyl phosphate | 8 |
| Tricresyl phosphate | 6 |
| Trihexyl phosphate | 7 |

Conventional solvents which reveal only poor penetration when used alone exhibit satisfactory penetration when used in admixture with the phosphoric acid esters to be empolyed in accordance with the present invention. Table III lists the depths of penetration of some such mixtures.

TABLE III

| Mixtures (parts by volume): | Penetration, mm. |
|---|---|
| Tri-isobutyl phosphate/terpentine (1:1) | 8 |
| Tri-isobutyl phosphate/pine oil (1:1) | 10 |
| Tri - isobutyl phosphate/ethylhexanol/g l y c o l (4.5:4.5:1) | 9 |
| Tri - isobutyl phosphate/ethylhexanol/g l y c o l (3.5:5.5:1) | 8 |
| Tri-isobutyl phosphate/propylene glycol (1:1) | 7 |

The phosphoric acid esters to be used in accordance with the present invention and mixtures of them with conventional solvents may be utilized not only to impregnate wood with fungicides and similar preservatives, but also, for example, to impregnate wood with known flameproofing agents, waterproofing agents, oilproofing agents or with polymerizable monomers (acrylic esters, vinyl compounds), or with condensible monomers (methylol and alkoxymethyl compounds of melamines and ureas), or with other chemicals. The use of phosphoric acid esters for the impregnation of wood according to the present invention may be effected, for example, by various methods, such as impregnation under pressure or with suction a combination of such techniques, or by coating or spraying.

EXAMPLE

A beam of solid pine wood was coated, in accordance with German Standard Specification No. 52,618 (250 g./m.²), along its top surface with a 1 wt. percent fungicide solution consisting of 99 parts of tri-isobutyl phosphate and 1 part of the calcium salt of N-nitrosocyclohexylhydroxylamine, and was stored for 7 days. To determine the depth to which the wood preservative had penetrated, the beam was cut up into 11 portions equal in size. 0 to 10 mm. was then planed off the treated top surface of the resulting blocks and the blocks were then subjected to a biological test.

The test for determining the resistance to ligniperdous fungi was carried out on the basis of German Standard Specification No. 52,176 (testing of wood preservatives—mycological short-time test—block method). The fungus used for the purposes of the test was *Coniophora cerebella*. Samples measuring 50 x 30 x 20 mm. (thickness decreasing progressively by 1 mm. up to 10 mm.) were placed in glass dishes each having a diameter of 15 cm. and a depth of 3 cm. and containing a malt nutrient agar covered with the test fungus. The samples were then subjected to fungus attack for a period of 10 weeks at 22° C. The results of the test are given in the following table.

| Sample depth of wood layer planed off in mm. | Extent of growth of *Coniophora cerebella* on samples after $x$ weeks: | | | | |
|---|---|---|---|---|---|
| | $x=2$ | 4 | 6 | 8 | 10 |
| 0 | 0 | 0 | 0 | 0 | 0 |
| 1 | 0 | 0 | 0 | 0 | 0 |
| 1 | 0 | 0 | 0 | 0 | 0 |
| 2 | 0 | 0 | 0 | 0 | 0 |
| 3 | 0 | 0 | 0 | 0 | 0 |
| 4 | 0 | 0 | 0 | 0 | 0 |
| 5 | 0 | 0 | 0 | 0 | 0 |
| 6 | 0 | 0 | 0 | 0 | 0 |
| 7 | 0 | 0 | 0 | 0 | 0 |
| 8 | 0 | 0 | 0 | 1 | 1 |
| 9 | 0 | 0 | 0 | 1 | 1 |
| 10 | 0 | 0 | 0 | 1 | 2 |
| Untreated | 2 | 3 | 3 | 3 | 3 |

The numerical values used in the table have the following meanings:
0 No fungus growth on samples.
1 Traces of fungus. growth
2 More substantial fungus growth.
3 Unrestricted fungus growth (sample completely covered by fungus mycelium).

What we claim is:

1. An impregnant for wood comprising, as a wood preservative, a salt of N-nitrosocyclohexylhydroxylamine dissolved in a solvent having deep penetration of wood, said solvent being a phosphoric acid ester of the formula:

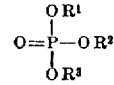

where the radicals $R^1$, $R^2$ and $R^3$, which may be identical or different, are alkyl, cycloalkyl, alkoxyalkyl or aryl radicals, or $R^1$ and $R^2$ together denote an alkylene radical.

2. A wood impregnant as claimed in claim 1 wherein said solvent includes, in addition to said ester, another wood-penetrating solvent.

3. A wood impregnant as claimed in claim 2 wherein the additional solvent is turpentine, pine oil, an ethyl hexanol and glycol mixture or propylene glycol.

4. A wood impregnant as claimed in claim 1 wherein said phosphoric acid ester is tri-isopropyl phosphate, tri-n-butyl phosphate, trihexyl phosphate, tri-isobutyl phosphate, tricyclohexyl phosphate, 2-oxo-2-ethyl-1,3,2-dioxaphosphorinane or tricresyl phosphate.

5. A wood impregnant as claimed in claim 1 wherein said salt in the calcium or potassium salt.

6. A wood impregnant as claimed in claim 5 wherein said ester is tri-isobutyl phosphate.

7. A wood impregnant as claimed in claim 1 wherein said ester is tri-isobutyl phosphate.

8. A wood impregnant as claimed in claim 1 wherein $R^1$, $R^2$ and $R^3$ each denote alkyl having 3 to 7 carbon atoms.

References Cited

UNITED STATES PATENTS

| 2,143,639 | 1/1939 | Caprio | 117—147 |
| 3,160,515 | 12/1964 | Goldstein et al. | 117—147 X |
| 3,248,457 | 4/1966 | D'Alelio | 21—7 X |
| 2,885,417 | 5/1959 | Heyden | 117—147 X |

OTHER REFERENCES

Chemical Abstracts, "Trialkyl Phosphates," by V. R. Widsthom, col. 6787(b), vol. 65, 1966.

WILLIAM D. MARTIN, Primary Examiner

W. K. TRENOR, Assistant Examiner

U.S. Cl. X.R.

21—7; 117—116, 147; 252—364; 260—920; 424—327